United States Patent
Zhu et al.

(10) Patent No.: US 8,810,209 B2
(45) Date of Patent: Aug. 19, 2014

(54) POWER DISTRIBUTION NETWORK BASED ON MULTIPLE CHARGE STORAGE COMPONENTS

(75) Inventors: Lizhong Zhu, Waterloo (CA); George Soliman Mankaruse, Kitchener (CA); Hongwei Liu, Ottawa (CA); Perry Jarmuszewski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 305 days.

(21) Appl. No.: 13/334,546

(22) Filed: Dec. 22, 2011

(65) Prior Publication Data

US 2013/0162195 A1    Jun. 27, 2013

(51) Int. Cl.
*H02J 7/04* (2006.01)
*H02J 7/00* (2006.01)

(52) U.S. Cl.
USPC ............................................ 320/140; 320/166

(58) Field of Classification Search
USPC .................................. 320/103, 140, 166, 167
See application file for complete search history.

(56) References Cited

U.S. PATENT DOCUMENTS

| | | | | |
|---|---|---|---|---|
| 6,856,119 | B2 * | 2/2005 | Crawford ...................... | 320/166 |
| 7,186,473 | B2 * | 3/2007 | Shiue et al. ...................... | 429/7 |
| 2007/0126397 | A1 | 6/2007 | Kogan et al. | |
| 2010/0244775 | A1 * | 9/2010 | Smith ........................... | 320/140 |
| 2011/0198929 | A1 | 8/2011 | Zhu et al. | |
| 2012/0229098 | A1 * | 9/2012 | Krauer et al. ................. | 320/140 |

FOREIGN PATENT DOCUMENTS

| | | |
|---|---|---|
| EP | 1445780 A1 | 8/2004 |
| EP | 2091055 A2 | 8/2009 |
| EP | 2360808 A1 | 8/2011 |
| EP | 2360809 A1 | 8/2011 |

OTHER PUBLICATIONS

Michelle Moody, CAP-XX Announces BriteSound Power Architecture to Pump up the Volume in Music Phones, "http://www.cap-xx.com/news/BriteSoundPowerArchitecture.htm", Jun. 12, 2007.
Presentations & White Papers, "http://www.cap-xx.com/resources/pres_wp/pres_wp.htm", 2008.
cap-XX Application Brief 1013 Effect of Supercapacitor Distance from a Load, "http://www.cap-xx.com/resources/app_briefs/ab1013.pdf", Oct. 11, 2002.

(Continued)

*Primary Examiner* — Richard V Muralidar
(74) *Attorney, Agent, or Firm* — Ridout & Maybee LLP

(57) ABSTRACT

A power distribution network includes multiple charge storage components and multiple charging circuits to control the charging and discharging of the charge storage components, which may comprise a battery and a supercapacitor. By appropriate arrangement and selection of the storage components, ripple in the power supply voltage, whose propagation to other components relying on the power distribution network may cause an audible buzz, may be significantly reduced. Additionally, appropriate arrangement and selection of the storage components, electromagnetic interference may also be significantly reduced. Optionally, an electromagnetic interference filter may be placed between the charge storage components.

14 Claims, 8 Drawing Sheets

(56) References Cited

OTHER PUBLICATIONS

Pierre Mars, Supercapacitors for mobile-phone power, "http://www2.electronicproducts.com/Supercapacitors_for_mobile-phone_power-article-farr_capxx_dec2007-html.aspx (for an article by Pierre Mars of Cap-xx)", Dec. 5, 2007.

Pierre Mars, Get enlightened about camera phone flash units—compare xenon to high-current LEDs, "http://www.mobilehandsetdesignline.com/howto/193401161?pgno=6", Oct. 23, 2006.

Pierre Mars, Energy Harvester Perpetually Powers Wireless Sensors, "http://electronicdesign.com/article/power/energy-harvester-perpetually-powers-wireless-senso.aspx", Nov. 17, 2008.

Marc Juzkow, Supercaps Do Double-Duty As DC Power Sources, "http://embedded365.com/Locator/Products/ArticleID/28446/Index.cfm?action=SiteMap", Sep. 30, 2003.

Extended European Search Report, Application No. 11195302.2, Dated May 23, 2012.

* cited by examiner

POWER DISTRIBUTION NETWORK BASED ON MULTIPLE CHARGE STORAGE COMPONENTS

FIELD

The present application relates generally to power distribution networks and, more specifically, to a power distribution network based on multiple charge storage components.

BACKGROUND

In a power distribution network with a power pack having a charge storage component (such as a battery), ripple in the power supply voltage may result from pulsed high-current draw by, for example, a radio frequency power amplifier circuit. Propagation of the ripple to other components relying on the power distribution network may cause undesirable effects. For an audio circuit, for example, the ripple may cause an audible buzz. Additionally, certain arrangements of the power pack relative to the power amplifier circuit may allow for generation of significant electromagnetic interference.

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

By dividing a single power supply into multiple charge storage components, power supply ripple may be reduced by buffering, at a secondary charge storage component, a pulsed high current that the power amplifier circuit may draw from the primary power supply. Optionally, an electromagnetic interference filter may be placed between the charge storage components.

In accordance with one embodiment, there is provided a power distribution network. The power distribution network includes a primary charging circuit, a first charge storage component having a first terminal connected to the charging circuit and a second terminal connected to a power supply common voltage, a second charge storage component having a first terminal, the second charge storage component having a second terminal connected to the power supply common voltage, a converter having an input terminal and an output terminal, the input terminal receiving an input voltage from the first terminal of the first charge storage component, and the output terminal supplying an output voltage, wherein a magnitude of the output voltage is altered relative to a magnitude of the input voltage, an electromagnetic interference filter having an input terminal and an output terminal, the input terminal of the electromagnetic interference filter receiving, from the output terminal of the converter, the output voltage and the output terminal of the electromagnetic interference filter supplying a filtered output voltage to the first terminal of the second charge storage component and a power amplifier circuit connected to the first terminal of the second charge storage component, the power amplifier circuit designed according to a range of variation of the filtered output voltage.

Other aspects and features of the present invention will become apparent to those of ordinary skill in the art upon review of the following description of specific embodiments of the invention in conjunction with the accompanying figures.

Figure 1:
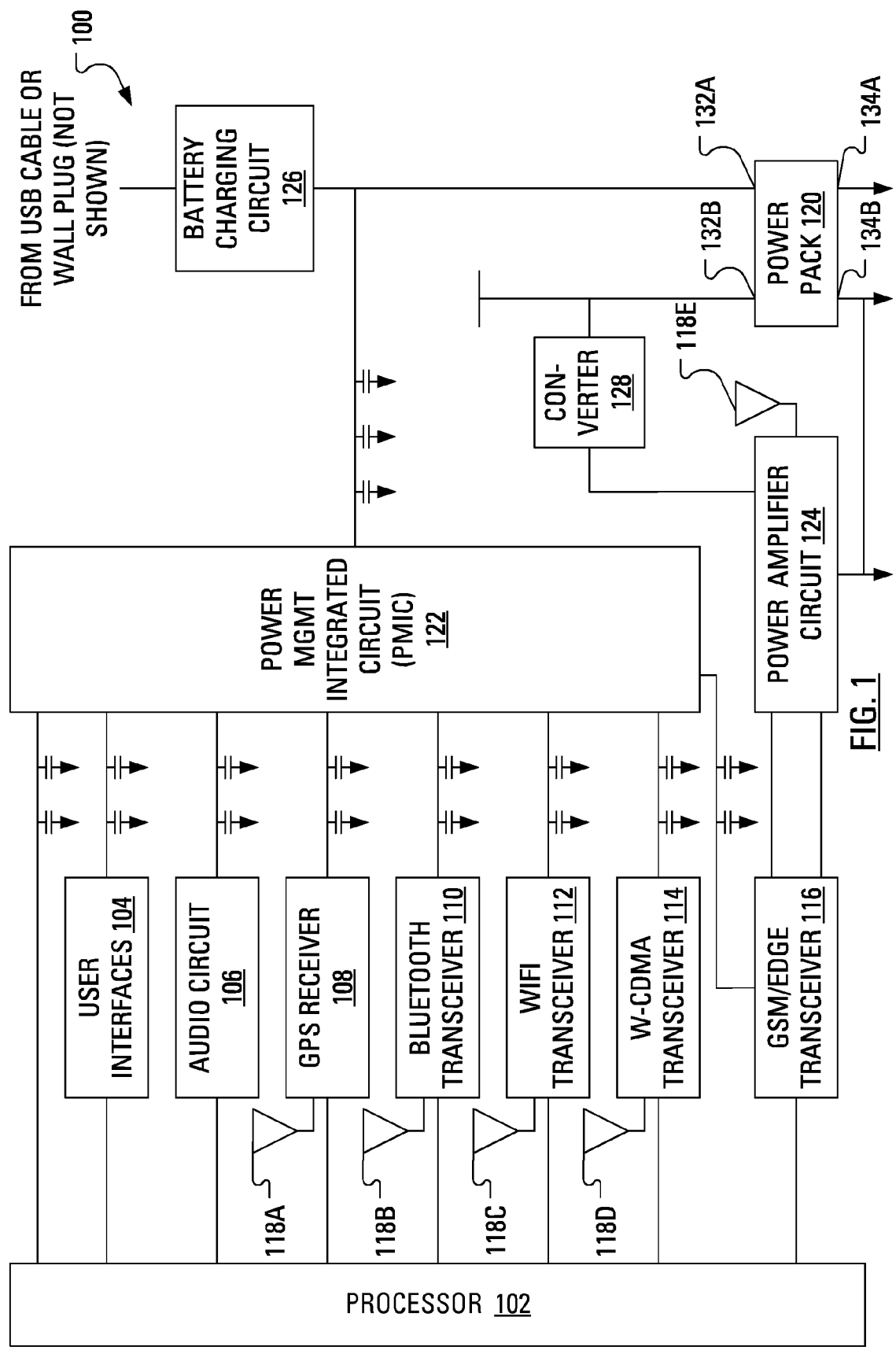
FIG. 1 illustrates a power distribution network with a power amplifier circuit and a single battery.

FIG. 1 illustrates a power distribution network 100 with a power amplifier circuit 124 and a power pack 120. The power pack 120 includes at least one charge storage component. As will be discussed below, the charge storage component may be any component that stores electrical charge, such as a chemical power cell or a supercapacitor. The power distribution network 100 is arranged for use in a mobile communication device. The mobile communication device includes a processor 102 for controlling the overall operation of the mobile communication device, or for controlling selected operations of the mobile communication device. Components of the mobile communication device include a housing (not shown) and multiple user interface components 104. The user interface components 104 may include an input device (e.g., a keyboard having a plurality of keys, a button, a trackball or touchpad) and an output device (e.g., a display), which may comprise a full graphic, or full color, Liquid Crystal Display (LCD). In some embodiments, the display may comprise a touchscreen display. In such embodiments, the keyboard may comprise a virtual keyboard. Other types of output devices may alternatively be utilized. The processor 102 controls the operation of the display, in part, responsive to actuation of the keys on the keyboard by a user of the mobile communication device.

Components of the mobile communication device may also include an audio circuit 106, which may control presentation, to the user, of an audio alert (a ring tone), audio received in a telephone call and audio based on a digital music file saved in device memory (not shown).

Components of the mobile communication device may also include a receiver 108 for use with the known global positioning system (GPS). The GPS receiver 108 is illustrated as being communicatively connected to a GPS receiver antenna 118A.

Components of the mobile communication device may also include a transceiver 110 for use in a short-range communications subsystem that enables communication between the mobile communication device and other proximate systems or devices, which need not necessarily be similar devices. For example, the short-range communications subsystem may include an infrared device and associated circuits and components, or a Bluetooth™ communication module to provide for communication with similarly-enabled systems and devices. The Bluetooth transceiver 110 is illustrated as being communicatively connected to a Bluetooth transceiver antenna 118B.

Components of the mobile communication device may also include a transceiver 112 for use in a wireless local area networking communication subsystem. A set of standards has been established by the Institute of Electrical and Electronics Engineers (IEEE) and is known as IEEE 802.11 standards. Products may be certified by the known Wi-Fi Alliance for adherence to the IEEE 802.11 standards. The Wi-Fi transceiver 112 is illustrated as being communicatively connected to a Wi-Fi transceiver antenna 118C.

Components of the mobile communication device may also include a transceiver 114 for use in a first wireless telecommunication subsystem. The first wireless telecommunication subsystem may be based on the known Wideband Code Division Multiple Access (W-CDMA) standard. The W-CDMA transceiver 114 is illustrated as being communicatively connected to a W-CDMA transceiver antenna 118D.

Components of the mobile communication device may also include a transceiver 116 for use in a second wireless telecommunication subsystem. The second wireless telecommunication subsystem may be based on the known Global System for Mobile communications (GSM) and Enhanced Data rates for GSM Evolution (EDGE) standards. The GSM/EDGE transceiver 116 is illustrated as being communicatively connected, through the power amplifier circuit 124, to a GSM/EDGE transceiver antenna 118E.

The processor 102, the user interfaces 104, the audio circuit 106, the GPS receiver 108, the Bluetooth transceiver 110, the Wi-Fi transceiver 112, the W-CDMA transceiver 114 and the GSM/EDGE transceiver 116 all maintain a connection to a power management integrated circuit (PMIC) 122.

The PMIC 122 and the power amplifier circuit 124 maintain a connection to the power pack 120. The power pack 120, through a first terminal 132A, maintains a connection to the PMIC 122 and to a battery charging circuit 126. The power pack 120, through a second terminal 134A, maintains a connection to a power supply reference voltage in common with components of the power amplifier circuit 124. Another pair of terminals includes a third terminal 132B connecting the power pack 120, through a step-down direct current to direct current (DC-to-DC) converter 128, to the power amplifier circuit 124 and a fourth terminal 134B connecting the power pack 120 to the power supply reference voltage.

The step-down DC-to-DC converter 128 receives, at an input terminal, the voltage available at the third terminal 132A of the power pack 120, converts the voltage received at the input terminal to a lower voltage and makes the lower voltage available, at an output terminal, to the power amplifier circuit 124. That is, a magnitude of the voltage available at the output terminal is altered relative to a magnitude of the voltage received at the input terminal. "Altering" the magnitude of the output voltage relative to a magnitude of the input voltage could include any change to the output voltage, including an increased voltage or a decreased voltage (for convenience, a step-down converter is used in portions of the description), and may also include a regulated voltage that is set to a magnitude without regard to what the magnitude of the input voltage is or may have been.

The power pack 120 may, for example, house a Li-Ion battery with an operational range of from 4.2V to 3.2V. The concepts described herein are not limited, however, to any particular form of energy storage or battery chemistry.

Generally, the connection of components is, as indicated by context, referring to the connection that supports the components function or operation with one another. In the context of an electrical connection, an electrical action in one component generally causes an electrical response in the other. The two electrically connected elements may be physically connected to one another, either directly or via one or more intermediate conductive elements.

Figure 2:
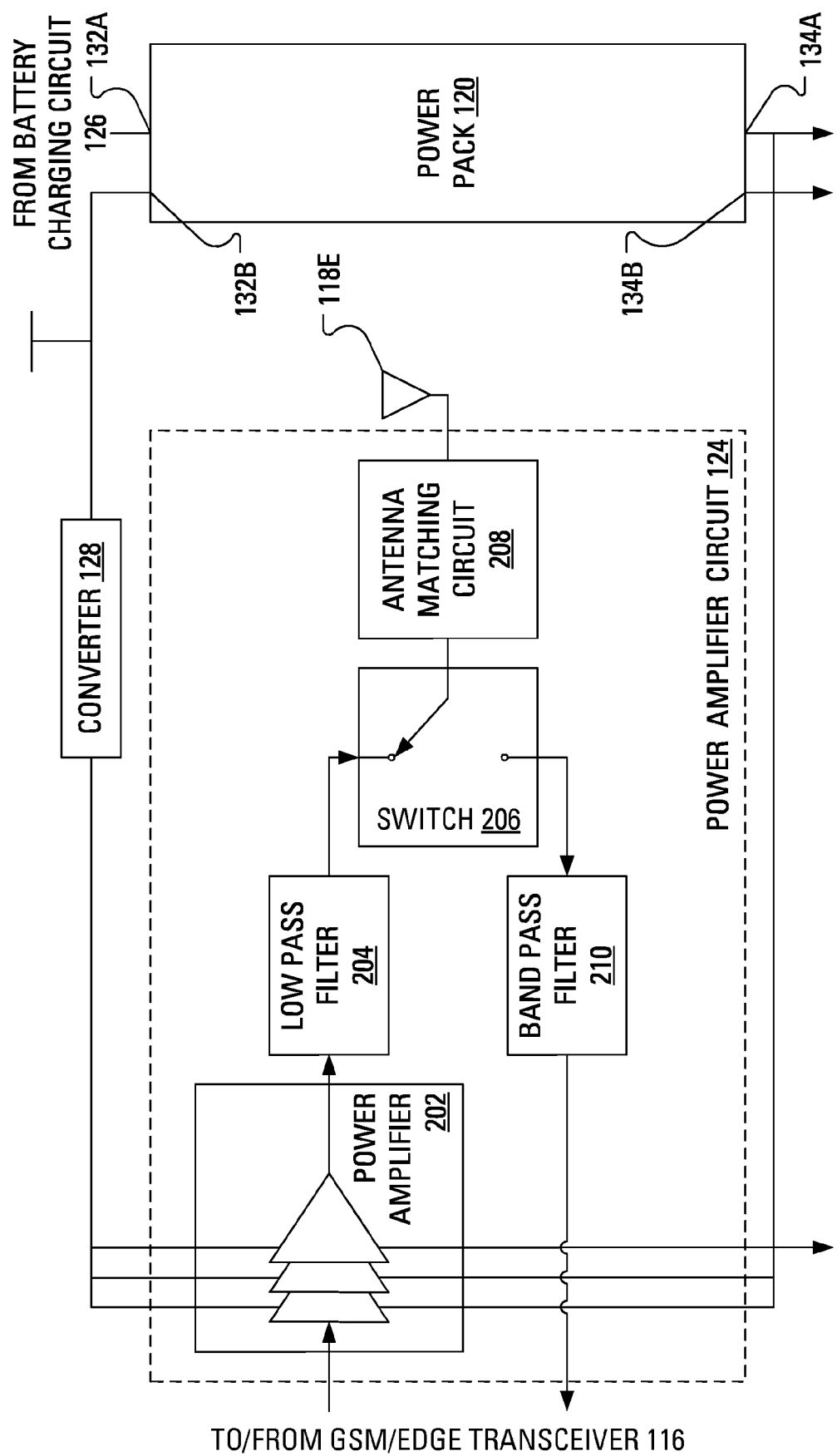
FIG. 2 schematically illustrates the power amplifier circuit of the power distribution network of FIG. 1, as supplied with power by a single battery.

Components of the power amplifier circuit 124 of FIG. 1 are illustrated in FIG. 2. The power amplifier circuit 124 includes (but is not necessarily limited to) a power amplifier 202 that connects to an output of the GSM/EDGE transceiver 116 and to an input to a low pass filter 204. A switch 206 connects, in one state, the output of the low pass filter 204 to an antenna matching circuit 208, which connects to the GSM/EDGE transceiver antenna 118E. In another state, switch 206 connects the output of the antenna matching circuit 208 to an input of a band pass filter 210. The output of the band pass filter 210 connects to an input of the GSM/EDGE transceiver 116.

The power amplifier 202 is illustrated as comprising multiple stages (not individually referenced) with each stage receiving a power supply voltage from a first terminal 212A of the power pack 120. Similarly, each stage shares power supply reference voltage with a second terminal 214A of the power pack 120.

In operation, the GSM/EDGE transceiver 116 may cause the power amplifier 202 to be operated in a so-called "pulse mode". The pulse mode of power amplifier operation is known to cause variation in the power supply voltage provided at the first terminal 212 of the power pack 120. The variation, or ripple, in the power supply voltage may be as much as 400 mV peak-to-peak due to high pulsed current. Unfortunately, the ripple may propagate from the power pack 120, to the PMIC 122, to the rest of the components. For the audio circuit 106, the ripple may cause an audible buzz (for GSM-based communication devices, many have experienced a buzz at 217 Hz), elimination of which has been perceived as difficult and costly.

The efficiency of the power amplifier 202 is generally maintained by a stable supply voltage. Unfortunately, in the case wherein the power pack 120 houses only a single charge storage component, during use, the power supply voltage provided at the third terminal 1328 of the power pack 120 can change, as the charge on the charge storage component is diminished, from 4.2V (fully charged) to as low as 3.2V (needing recharge). Indeed, when the charge on the charge storage component has been reduced and the power supply voltage provided at the third terminal 1328 of the power pack 120 is correspondingly reduced, the power amplifier 202 may be forced into an undesired saturation mode. When the power amplifier 202 is operating in saturation mode, the power level of the radio frequency (RF) signal output to the GSM/EDGE transceiver antenna 118E is reduced relative to a preferred power level. Additionally, it may be considered that operation of the power amplifier 202 in saturation mode compromises the output spectrum.

Furthermore, when designing the power amplifier 202 to account for operation in wide range supply voltages, design sacrifices or accommodations are required to be made. For example, such design sacrifices may include the addition of circuits designed to control the behavior of the power amplifier 202 under reduced supply voltage. One such circuit is known as an anti-saturation loop. Such additional circuits may be considered to increase the complexity and cost of the power amplifier 202.

A power amplifier current loop may be defined as being formed through the power pack 120 and the power amplifier 202. With the relatively large area of the loop, it may be shown that the pulse mode of power amplifier operation causes measurable magnetic radiation to be emitted. This emission may be shown to interfere with other circuits, such as the circuits found in hearing aids, especially among the circuits found in hearing aids that utilize a T-magnetic coil (or T-coil) to pick up an audio signal. The emission of magnetic radiation from the power amplifier current loop can also be problematic when the radiation couples to various transducers and other components within the enclosure of the mobile communication device to which the power distribution network 100 provides power.

It may be shown that Radio Frequency (RF) interference signals (any unwanted signals) that are present at the power amplifier 202 during transmission may be coupled to other circuits 104, 106, 108, 110, 112, 114, 116, 122, 126 via the power supply lines. If the interference signals become coupled to the battery housed by the power pack 120, for example, it can be shown that those interference signals may be radiated by the battery due to the charge storage component structure. The charge storage component structure may, for example, involve the third terminal 132B (i.e., the positive contact) of the power pack 120 being connected to the mobile communication device housing. In such a case, it may be shown that the mobile communication device housing may behave like an antenna.

In overview, by dividing the power supply into more than one charge storage component, power supply ripple may be reduced by buffering, at a secondary power supply, a pulsed high current that the power amplifier circuit may draw from the primary power supply.

When the designer of the circuit supplying power to the power amplifier 202 mandates, to a vendor designing the power amplifier 202, that the power amplifier 202 has to handle a wide range of variation of supply voltage, the flexibility of the vendor to design the power amplifier 202 for improved linearity and higher efficiency is reduced. Conveniently, when the circuit supplying power to the power amplifier 202 is designed as proposed herein, vendors will have more freedom and flexibility to design the power amplifier 202.

Figure 3:
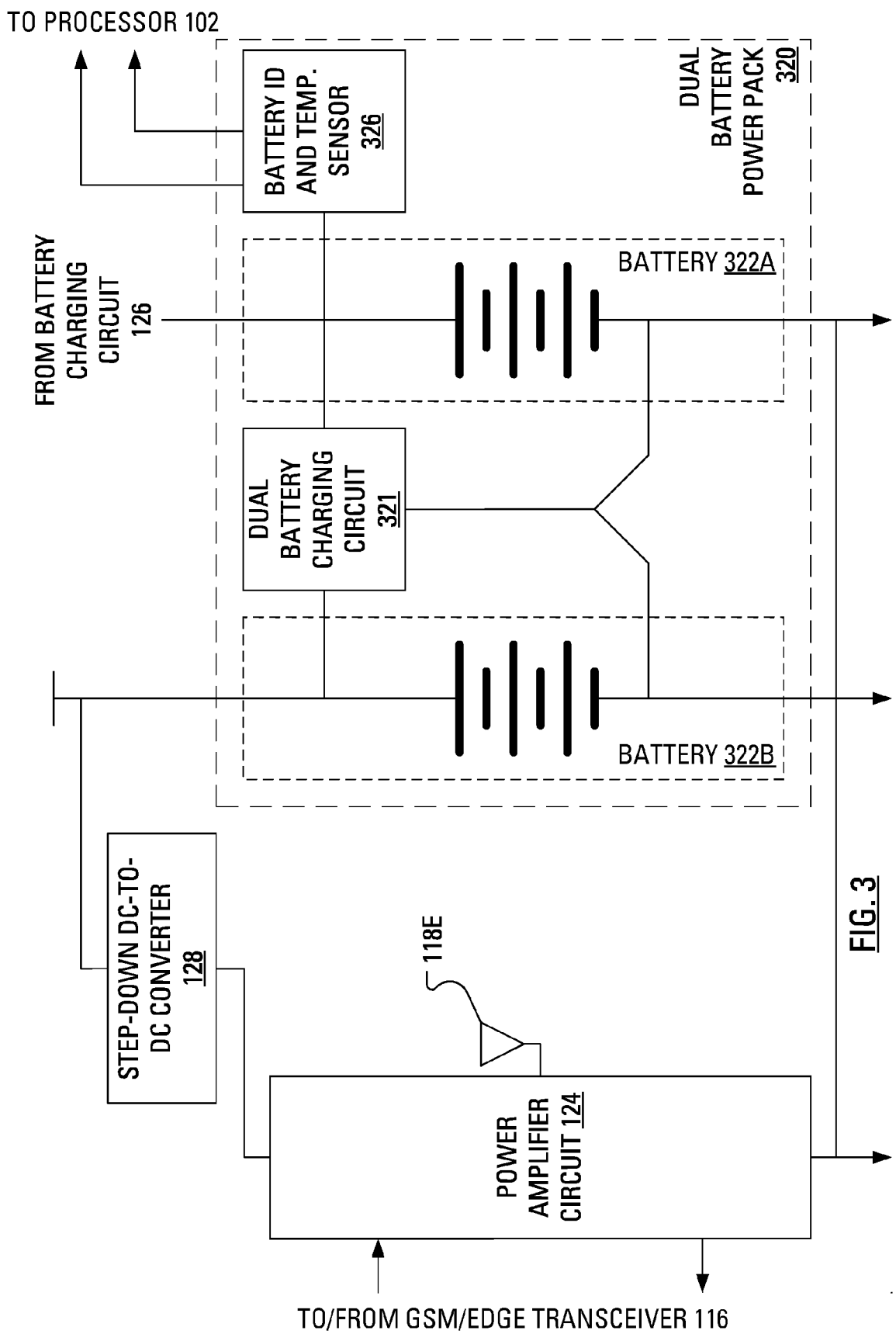
FIG. 3 schematically illustrates a power amplifier circuit for use in a power distribution network, as supplied with power by multiple batteries.

A first solution to the above set of problems involves providing multiple batteries in the power pack 120 rather than a single battery. For example, FIG. 3 illustrates the power amplifier circuit 124 as supplied with power by multiple charge storage components. The multiple charge storage components are provided in a dual battery power pack 320.

The dual battery power pack 320 includes a first battery 322A and a second battery 322B. The first battery 322A has a first terminal connected to the battery charging circuit 126 and a second terminal connected to a common supply voltage for the power distribution network. A second terminal of the second battery 322B is also connected to the common supply voltage for the power distribution network. A first terminal of the second battery 322B and the first terminal of the first battery 322A are connected to, and interposed by, a dual-battery charging circuit 321. While the battery charging circuit 126 may be considered to be a "primary" charging circuit, the dual-battery charging circuit 321 may be considered to be a "secondary" charging circuit.

The step-down DC-to-DC converter 128, familiar from FIGS. 1 and 2, converts the voltage available at the first terminal of the second battery 322B to a lower voltage and makes the lower voltage available to the power amplifier circuit 124. The power amplifier circuit 124 of FIG. 3 is arranged to receive a signal from the GSM/EDGE transceiver 116 for transmission on the GSM/EDGE transceiver antenna 118E. Additionally, the power amplifier circuit 124 of FIG. 3 is arranged to receive a signal from the GSM/EDGE transceiver antenna 118E and transmit the received signal to the GSM/EDGE transceiver 116.

The dual battery power pack 320 includes a battery identifier and temperature sensor 326. The battery identifier and temperature sensor 326 connects to the processor 102 (FIG. 1). The battery identifier portion is adapted to output an identification of the dual battery power pack 320. The temperature sensor portion is adapted to sense a temperature within the dual battery power pack 320 and provide an output signal indicative of the temperature to the processor 102.

Conveniently, in operation, the dual-battery charging circuit 321 can act to continuously charge the second battery 322B, thereby maintaining a more consistent charge on the second battery 322B than would be possible with a single-battery power pack. Consequently, the power amplifier circuit 124 of FIG. 3 may be designed to take advantage of a consistent voltage (i.e., a relatively narrow range of variation) at the output of the step-down DC-to-DC converter 128 in a manner unavailable to the designer of the power amplifier circuit 124 of FIG. 1. By continuously charging the second battery 322B, the Equivalent Series Resistance (ESR) of the second battery 322B may be maintained at a magnitude that is consistently lower than the ESR of the first battery 322A. Consequently, a majority of the high pulsed current drawn by the power amplifier circuit 124 will pass though the second battery 322B.

In the case wherein the power pack has only a single charge storage component (such as a Li-Ion battery), the power amplifier circuit 124 may be designed to handle an operational range of supply voltage that extends from 4.2V to 3.2V. As a result of using a power pack with multiple charge storage components, as disclosed herein, the range of the supply voltage may be tightened to, for example, a range that extends from 3.6V to 3.5V. By tightening the range of the supply voltage that the power amplifier circuit 124 is to be able to handle, the power amplifier designer can improve the performance of the power amplifier circuit 124. Such performance improvement may include increased output power, increased efficiency and improved linearity.

The second battery 322B may be seen to buffer a pulsed high current draw from the first battery 322A. As a consequence of this buffering, the audible buzz, due to propagation of the power supply ripple to the audio circuit 106, may be significantly reduced.

Notably, the concepts described in the present application do not necessarily exclude other approaches to reduction of the effects of ripple. Indeed, advantageously, the approaches described in herein may work non-exclusively with other approaches to reduction of the effects of ripple.

Figure 4:
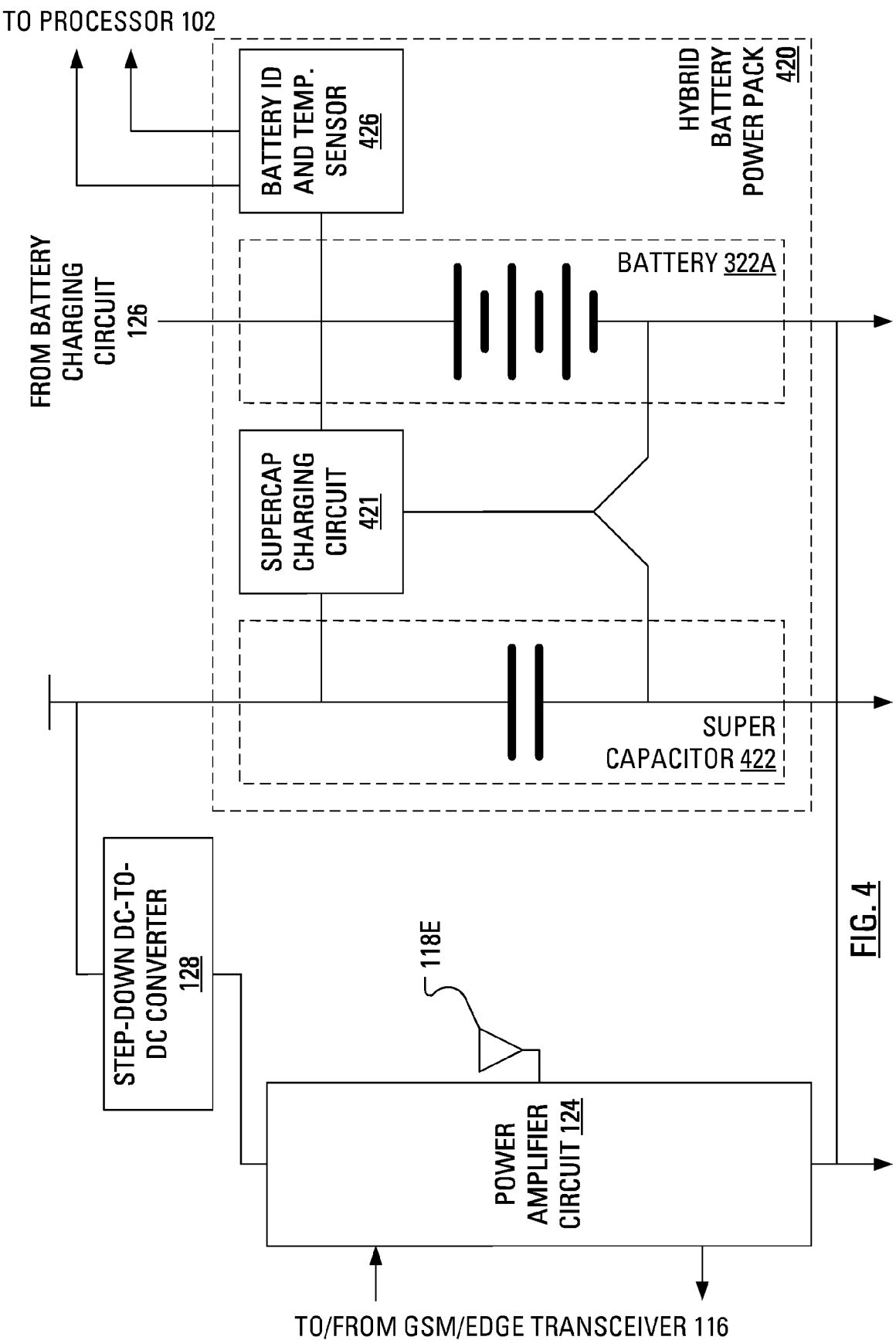
FIG. 4 illustrates a power amplifier circuit for use in a power distribution network, where the power amplifier circuit includes a power pack enclosing a supercapacitor and a battery.

A second solution to the above set of problems involves replacement of the second battery 322B in the dual battery power pack 320 of FIG. 3 with an alternative charge storage component in the form of a supercapacitor 422, thereby completing contents of a hybrid battery power pack 420 (see FIG. 4).

In general, a supercapacitor resembles a regular capacitor with the exception that a supercapacitor offers very high capacitance in a small package. Energy storage is accomplished by means of static charge rather than being accomplished by means of an electro-chemical process, such as in the manner of a conventional chemical battery. In common with a regular capacitor, a supercapacitor has a positive plate and a negative plate. By applying a voltage differential to the positive and negative plates, a charge may be stored in the supercapacitor. Whereas a regular capacitor typically includes conductive foils and a dry separator, the supercapacitor typically includes special electrodes and an electrolyte.

The known Part No. EDLC152344-551-2F-30 by TDK of Nihombashi, Chuo, Tokyo, Japan is an example of a component that may be used for the supercapacitor 422. Specifications of this example component include: dimensions 23×44× 1.5 mm; rated voltage −4.2V continuous bias, 5.7V intermittent bias; and nominal capacitance 550 mF. The concepts described herein are not limited, however, to any particular supercapacitor, or any particular capacitance, or any particular structure for charge storage or charge separation.

In common with the dual battery power pack 320, the first battery 322A of hybrid battery power pack 420 has a first terminal connected to the battery charging circuit 126 and a second terminal connected to a common supply voltage for the power distribution network. A second terminal of the supercapacitor 422 is also connected to the common supply voltage for the power distribution network. A first terminal of the supercapacitor 422 and the first terminal of the first battery 322A are connected to, and interposed by, a supercapacitor charging circuit 421. The step-down DC-to-DC converter 128 converts the voltage available at the first terminal of the supercapacitor 422 to a lower voltage and makes the lower voltage available to the power amplifier circuit 124.

As will be clear to one skilled in the art, the power distribution network 100 can be designed with more than one supercapacitor if there is more than one high current load.

The hybrid battery power pack 420 includes a battery identifier and temperature sensor 426. The battery identifier and temperature sensor 426 connects to the processor 102 (FIG. 1) to provide battery identity and information regarding the temperature of the hybrid battery power pack 420.

In a manner consistent with the dual-battery charging circuit 321, the supercapacitor charging circuit 421 can act to maintain a consistent charge on the supercapacitor 422, thereby distinguishing the hybrid battery power pack 420 from a single-battery power pack, for which a consistent charge is desired but, as has been discussed hereinbefore, is difficult to achieve.

The supercapacitor charging circuit 421, and the dual-battery charging circuit 321, may be implemented as a standard switched power supply, which can be a step-up converter or a step-down converter with a predetermined charging current. However, it should be clear that the present disclosure is not dependent on a particular implementation of charging circuit.

In various embodiments, the step-down DC-to-DC converter 128 may be short-circuited, so that the second battery 322B in the dual battery power pack 320 of FIG. 3 or the supercapacitor 422 in the hybrid battery power pack 420 of FIG. 4 is directly connected to the power amplifier circuit 124. In such an embodiment, the charging circuit, e.g., the dual-battery charging circuit 321 in FIG. 3 or the supercapacitor charging circuit 421 in FIG. 4, serves as both a charging circuit and a voltage regulating circuit. The second battery 322B or the supercapacitor 422 in these alternative embodiments retain their use as providers of the majority of the instant power required from the power amplifier circuit 124 during a pulsed high current draw.

In a further alternative embodiment, the charging circuit, e.g., the dual-battery charging circuit 321 in FIG. 3 or the supercapacitor charging circuit 421 in FIG. 4, may be short circuited, so that the second battery 322B or the supercapacitor 422 is directly connected to the first battery 322A, while the step-down DC-to-DC converter 128 is used to regulate the battery output voltage to a fixed supply voltage to the power amplifier circuit 124. The second battery 322B or the supercapacitor 422 in these alternative embodiments retain their use as providers of the majority of the instant power required from the power amplifier circuit 124 during a pulsed high current draw.

In a manner consistent with the dual battery power pack 320 having an ESR that is lower than the ESR of the single battery power pack 120, it may be shown that the ESR of the combination of the step-down DC-to-DC converter 128 and the hybrid battery power pack 420 also has a lower ESR than a hypothetical single-battery power pack. Experimentation has shown that the ESR of the hypothetical single-battery power pack may be in the order of 150 mΩ, while the ESR of the combination of the step-down DC-to-DC converter 128 and the hybrid battery power pack 420 may be in the order of only 30 mΩ.

A third solution to the above set of problems involves rearrangement of the components of the hybrid battery power pack 420 of FIG. 4 such that only the first battery 322A remains inside a battery power pack, thereby leading to the naming of a solo battery power pack 520.

In common with the dual battery power pack 320 and the hybrid battery power pack 420, the first battery 322A of a solo battery power pack 520 has a first terminal connected to the battery charging circuit 126 and a second terminal connected to a common supply voltage for the power distribution network. A second terminal of the supercapacitor 422, which is external to the solo battery power pack 520, is also connected to the common supply voltage for the power distribution network. Just as in the circuit of FIG. 4, a first terminal of the supercapacitor 422 and the first terminal of the first battery 322A are connected to, and interposed by, the supercapacitor charging circuit 421. The step-down DC-to-DC converter 128 converts the voltage available at the first terminal of the supercapacitor 422 to a lower voltage and makes the lower voltage available to the power amplifier circuit 124.

The solo battery power pack 520 includes a battery identifier and temperature sensor 526. The battery identifier and temperature sensor 526 connects to the processor 102 (FIG. 1) to provide battery identity and information regarding the temperature of the solo battery power pack 520.

Figure 5:
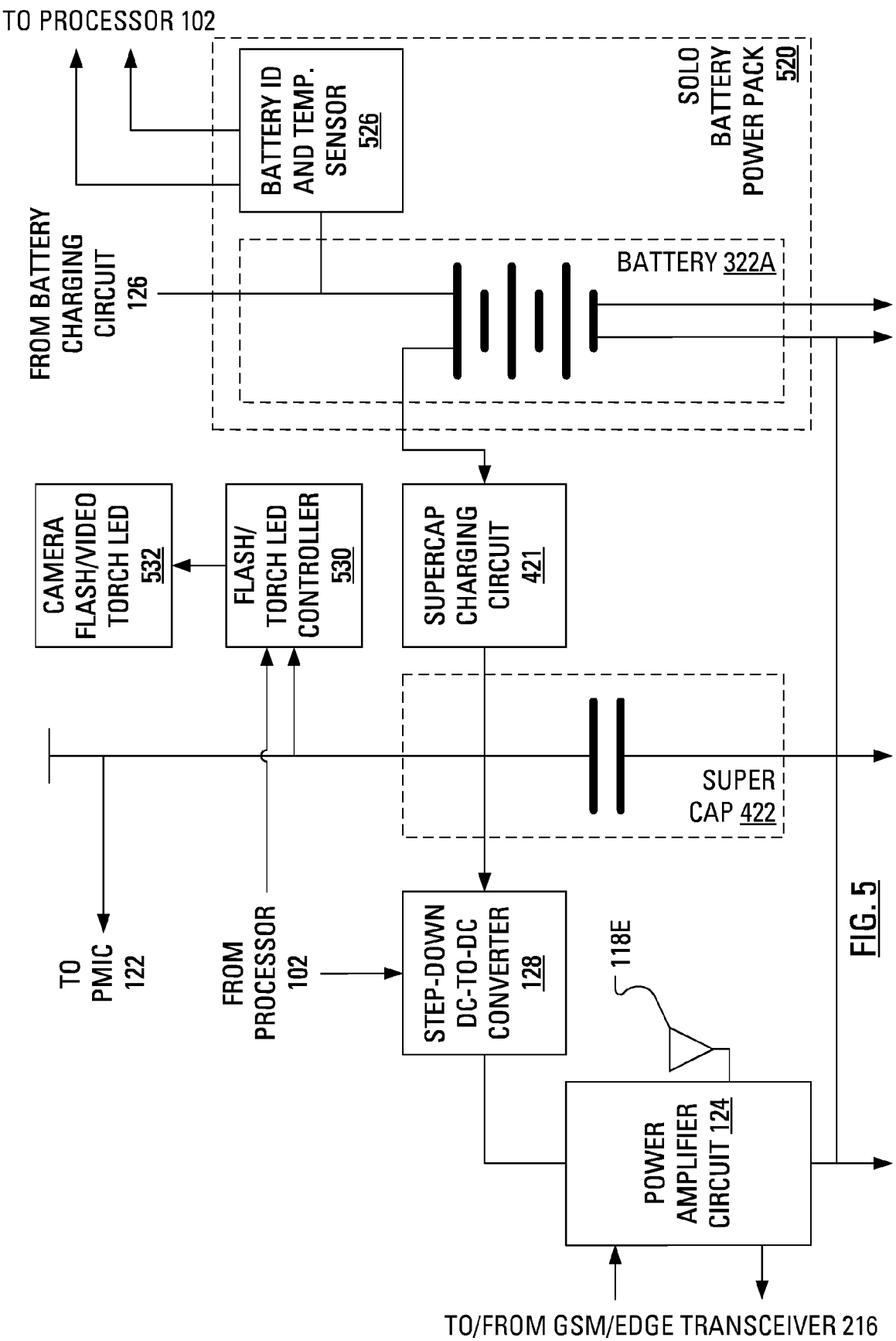
FIG. 5 illustrates a power amplifier circuit for use in a power distribution network having additional components, where the power amplifier circuit includes a supercapacitor and a battery, where the supercapacitor is arranged to supply power to the additional components.

The circuit of FIG. 5 includes additional components that may be found in mobile communication devices. The additional components include a Light Emitting Diode (LED) 532 for use as a flash when using the mobile communication device to capture a still photograph. The LED 532 may also be used as a torch to provide light when the mobile communication device is used to capture video. Associated with, and connected to, the LED 532 is a controller 530. The controller 530 receives power from the first terminal of the supercapacitor 422. Additionally, the controller 530 receives instructions from the processor 102 (FIG. 1).

It has been discussed hereinbefore that the pulse mode of power amplifier operation is known to cause a ripple in the power supply voltage provided at a battery and that the ripple may be shown to adversely affect operation of other circuits. It may also be shown that other circuits in a typical mobile communication device can cause a ripple in the power supply voltage. An example of such a ripple-causing circuit is the combination of the LED 532 and the controller 530 in FIG. 5.

In a typical mobile communication device, the power amplifier circuit 124 and the LED 532 may not be operated at the same time due to high pulsed power consumption and the resultant voltage ripples propagating to other circuits. It can be shown that use of the supercapacitor 422, with the step-down DC-to-DC converter 128 and the supercapacitor charging circuit 421, will allow simultaneous operation of the power amplifier circuit 124 and the LED 532, without causing significant power supply voltage ripples to propagate to other circuits. Indeed, testing has shown that power supply voltage ripples may be reduced from 400 mV peak-to-peak to less than 200 mV peak-to-peak.

Conveniently, and in contrast to the power distribution networks represented by the circuits of FIGS. 1, 2, 3 and 4, the circuit of FIG. 5 makes available continued operation of the mobile communication device even in the absence of the solo battery power pack 520. Accordingly, the mobile communication device may, for example, continue to participate in a cellular telephone call or continue to play a digital music file, even as a previously installed solo battery power pack is exchanged for a replacement solo battery power pack.

As discussed hereinbefore, efficiency of the power amplifier circuit 124 may be improved through designing the power amplifier circuit 124 for a tightly regulated supply voltage from the step-down DC-to-DC converter 128. Such improved efficiency during operation may be further improved by dynamically setting the output of the step-down DC-to-DC converter 128 to the power amplifier circuit 124 based on a desired output power level. To this end, the step-down DC-to-DC converter 128 may receive instructions from the processor 102 (FIG. 1). Notably, the instructions may be of any kind, including instructions in the form of modulated pulses.

It has been discussed hereinbefore that when the charge on a single battery housed by the power pack 120 has been reduced and the power supply voltage provided at the third terminal 132B (FIG. 2) of the power pack 120 is correspondingly reduced, the power amplifier 202 may be forced into a mode of operation known as "saturation". When the power amplifier 202 is operating in saturation mode, the power level of the radio frequency (RF) signal output to the GSM/EDGE transceiver antenna 118E is reduced relative to a preferred power level in order to revert the power amplifier 202 out of the saturation. By appropriately setting the output of the step-down DC-to-DC converter 128 to the power amplifier circuit 124, the power amplifier circuit 124 may be prevented from entering into saturation mode.

The power amplifier current loop defined in FIG. 2 as being formed through the power pack 120 and the power amplifier 202 may be defined in FIGS. 4 and 5 as being formed through the step-down DC-to-DC converter 128, the supercapacitor 422 and the power amplifier 124. The relatively large area of the power amplifier current loop defined in FIG. 2 may be reduced by arranging the step-down DC-to-DC converter 128 and the supercapacitor 422 to be relatively closer to the power amplifier 124. Such an arrangement may be seen to be most feasible in the circuit of FIG. 5, wherein the supercapacitor 422 is separate from the first battery 322A. With a power amplifier current loop defined to have a significantly reduced area, it follows that the magnetic emission from the power amplifier current loop will have a significantly reduced magnitude, thereby interfering to a lesser degree with magnetic susceptible circuits, such as hearing aids, which utilize a T-coil to pick up an audio signal.

RF interference signals have been discussed hereinbefore as being present at the power amplifier 202 (FIG. 2) during transmission and being coupled to other circuits 104, 106, 108, 110, 112, 114, 116, 122, 126 via the power supply lines.

The proposed power distribution network may be shown to reduce the decoupling requirements for all mobile sub circuits.

Relatively long power supply traces on a printed circuit board (PCB) used to implement power distribution networks are known to occupy PCB real estate and maintain a relatively high ESR, which may be considered detrimental to the efficiency of power supplied by the power pack. A further consequence of the proposed reduced-area power amplifier current loop defined in FIG. 5 is a reduction in length of power supply traces, thereby preserving PCB real estate and reducing the ESR of the power supply traces, leading to an increase in the efficiency of the use of the power from the first battery 322A.

As should be apparent to a person of ordinary skill in the art, the alternative charge storage component need not be restricted to the supercapacitor 422 of FIGS. 4 and 5. Indeed, many other types of capacitors may be suitable.

Furthermore, as used in the present disclosure, a charging circuit is described as circuitry that can deliver electrical power from a power supply (which may include one or more charge storage components) to a component that consumes the electrical power. For clarity, the charging circuits and converters have been illustrated as distinct elements. In practice, however, charging circuits and converters may be combined and may share some circuit elements.

A person of ordinary skill in the art will appreciate that there exist a wide variety of types of converters for use as the converter 128, including switched converters. Additionally, although the converter 128 has been disclosed as a step-down DC-to-DC converter, there exist applications in which a step-up converter would be more appropriate. For example, in the case wherein the power amplifier circuit 124 is designed for high linearity, the power amplifier circuit 124 may be designed to use a supply voltage that is higher than the voltage available from the installed power pack. In addition to converters that only step-up or step-down, there exist converters that both step-up and step-down.

The above-described embodiments, and variations thereof, may realize one or more advantages, some of which have been previously mentioned. As noted above, when the circuit supplying power to the power amplifier 202 (FIG. 2) is designed as proposed herein, vendors will have more freedom and flexibility to design the power amplifier circuit 124 and, more specifically, the power amplifier 202. Additionally, the dual-battery charging circuit 321 (FIG. 3) can act to continuously charge the second battery 322B, thereby maintaining a more consistent charge on the second battery 322B than would be possible with a single-battery power pack. By continuously charging the second battery 322B, the ESR of the second battery 322B may be maintained at a magnitude that is consistently lower than the ESR of the first battery 322A so that a majority of the high pulsed current drawn by the power amplifier circuit 124 will pass though the second battery 322B. Further advantageously, the circuit of FIG. 5 makes available continued operation of the mobile communication device even in the absence of the solo battery power pack 520.

Figure 6:
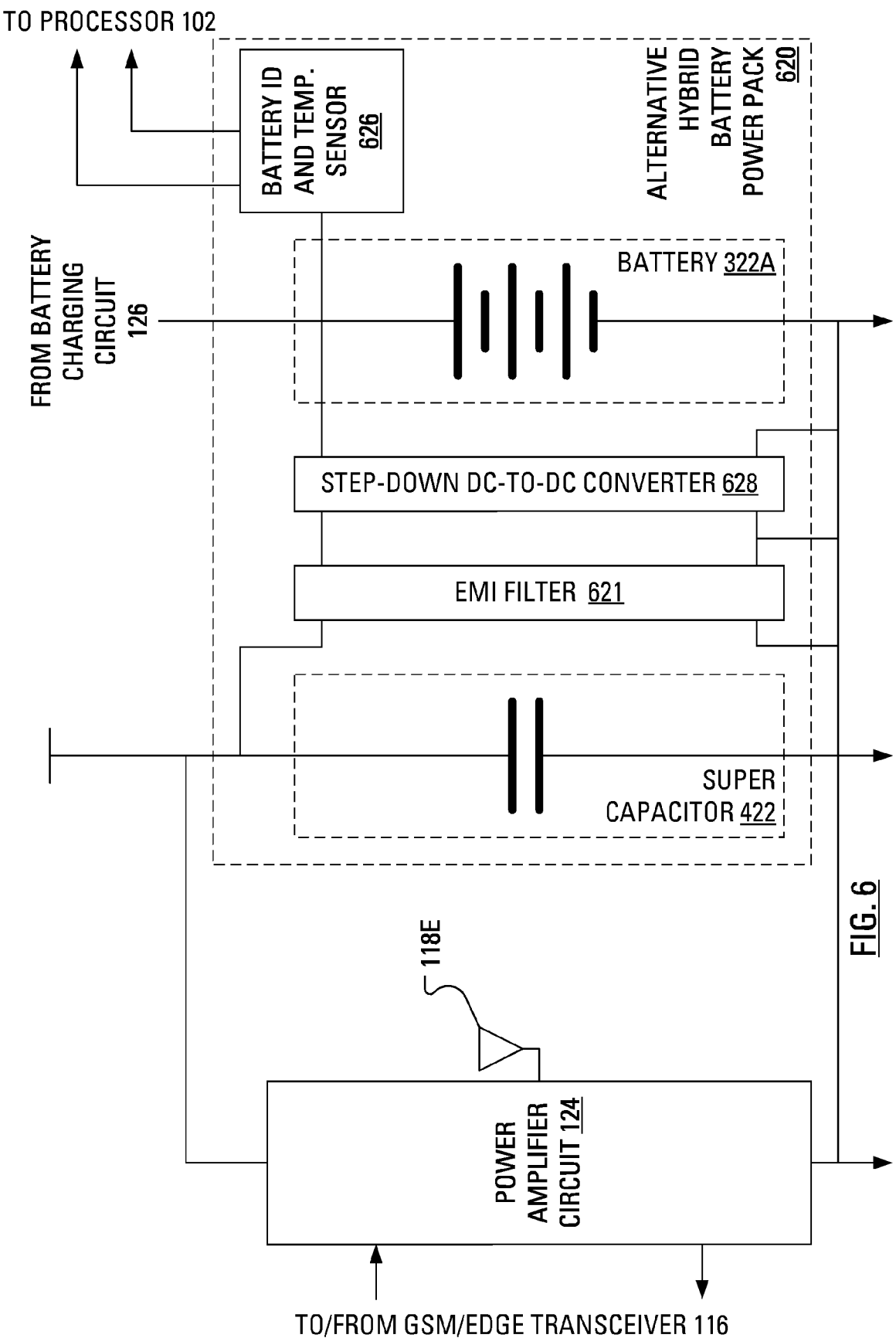
FIG. 6 illustrates a power amplifier circuit for use in a power distribution network, where the power amplifier circuit includes a power pack enclosing a battery, a supercapacitor, an EMI filter and a step-down DC-to-DC converter.

FIG. 6 illustrates an alternative hybrid battery power pack 620 to the hybrid battery power pack 420 of FIG. 4. The supercapacitor 422 and the first battery 322A remain. However, in parallel with the supercapacitor 422 and the first battery 322A, the alternative hybrid battery power pack 620 includes an Electro-Magnetic Interference (EMI) filter 621 and a step-down DC-to-DC converter 628. Notably, the step-down DC-to-DC converter 128 that is in place between the super capacitor 422 and the power amplifier circuit 124 in the configuration of FIG. 4 has been removed for the configuration of FIG. 6.

Figure 8:
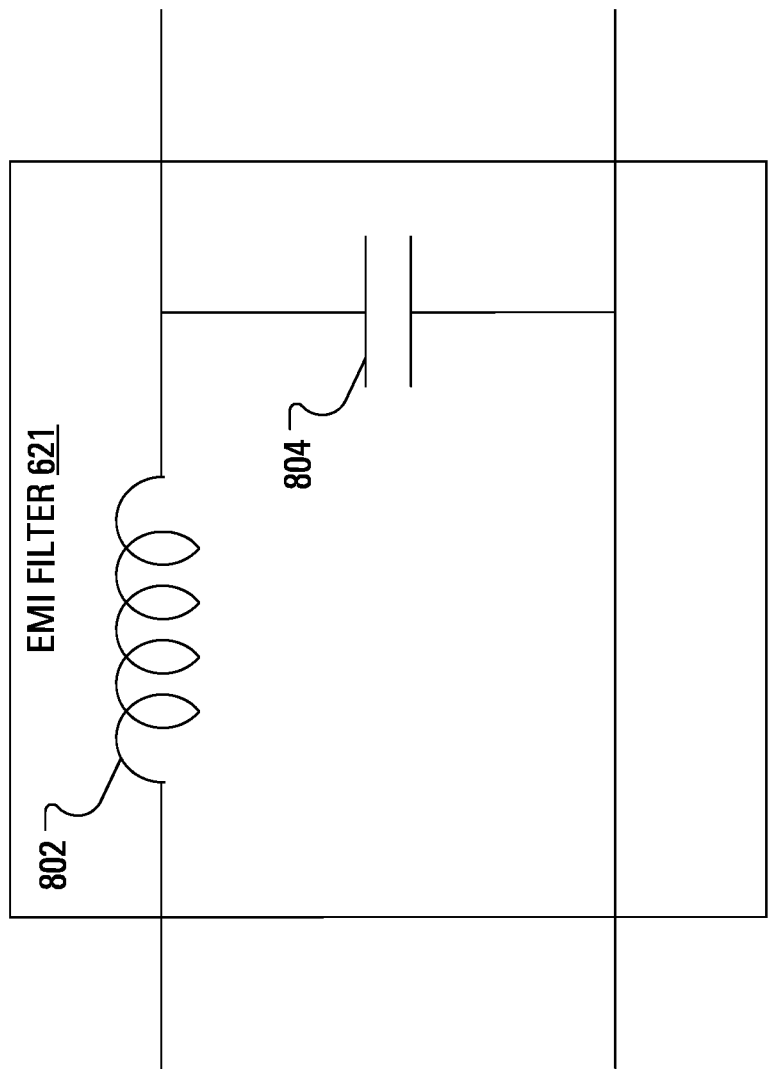
FIG. 8 illustrates an example EMI filter for use as the EMI filter in either FIG. 6 or FIG. 7.

An example EMI filter for use as the EMI filter 621 is illustrated in FIG. 8 as including an inductance, such a series ferrite bead 802, and a shunt bypass capacitance, such as a capacitor 804, to form a low pass filter. The EMI filter 621 can prevent RF energy from leaking back to the step-down DC-DC converter 628 from the power supply pins (not shown) of the power amplifier circuit 124. Such leaking RF energy, including harmonics, could potentially cause instability in the operation of the step-down DC-DC converter 628. In the absence of the EMI filter 621, leaking RF energy may also couple to other circuits and even radiate out by battery and battery contact clips, flex circuits (if any) and other circuits.

In common with the hybrid battery power pack 420 of FIG. 4, the first battery 322A of the alternative hybrid battery power pack 620 of FIG. 6 has a first terminal connected to the battery charging circuit 126 and a second terminal connected to a common supply voltage for the power distribution network.

A first battery-side terminal of the step-down DC-to-DC converter 128 is connected to the first terminal of the first battery 322A. The step-down DC-to-DC converter 128 has a second battery-side terminal connected to a common supply voltage for the power distribution network. In operation, the step-down DC-to-DC converter 628 converts the voltage available at the first terminal of the first battery 322A to a lower voltage and makes the lower voltage available to the power amplifier circuit 124 at a first PA-circuit-side terminal of the step-down DC-to-DC converter 128.

The EMI filter 621 may be represented in a two port network configuration. A first converter-side terminal of the EMI filter 621 is connected to the first filter-side terminal of the step-down DC-to-DC converter 628. A second converter-side terminal of the EMI filter 621 is connected to the common supply voltage for the power distribution network along with a second filter-side terminal of the step-down DC-to-DC converter 628.

A first terminal of the supercapacitor 422 is connected to a first PA-circuit-side terminal of the EMI filter 621. A second terminal of the supercapacitor 422 is connected to the common supply voltage for the power distribution network along with a second PA-circuit-side terminal of the EMI filter 621.

The alternative hybrid battery power pack 620 includes a battery identifier and temperature sensor 626. The battery identifier and temperature sensor 626 connects to the processor 102 (FIG. 1) to provide battery identity and information regarding the temperature of the hybrid battery power pack 620.

In concert, the step-down DC-to-DC converter 628 and the EMI filter 621 can act to maintain a consistent charge on the supercapacitor 422, thereby distinguishing the alternative hybrid battery power pack 620 from a single-battery power pack, for which a consistent charge is desired but, as has been discussed hereinbefore, is difficult to achieve.

It may be shown that the circuit of FIG. 6 may reduce power supply ripple from as high as 235 mV to less than 40 mV peak-to-peak. This is mainly due to the supercapacitor 422, which delivers most of the energy to power amplifier circuit 124 during a transmission pulse. It may further be shown that only small fractional current, of about 250 to 300 mA, presents from the PA-circuit-side terminal of the step-down DC-to-DC converter 628 back to the battery-side terminal. Using the 250 mA end of the current range and an ESR of the first battery 322A in the order of 150 mΩ, a 37.5 mV voltage ripple results.

It is known that the conventional voltage ripple will cause audible GSM buzz from ceramic bypass capacitors that are directly and/or indirectly connected to the Li-Ion battery, due to the well-known Piezoelectric Deformation effect. Specific ceramic capacitors are available, for the power supply bypassing, with reduced susceptibility to Piezoelectric Deformation, however, the lack of such susceptibility comes with a higher price for such capacitors. It is also known to use the vertical-placement-type of ceramic capacitor to reduce audible GSM buzz.

Advantageously, by significantly reducing the voltage ripple, there is a commensurate reduction in the need to use more expensive capacitors or the vertical-placement-type of the ceramic capacitor.

It has been discussed hereinbefore that, due to variability in the voltage level available to power amplifier circuit 124, prior power distribution networks have been often equipped with sophisticated anti-saturation loop circuits to dynamically adjust the power amplifier circuit 124 to handle the variation of the battery voltage. As use of the alternative hybrid battery power pack 620 can be shown to reduce variability in the voltage level available to the power amplifier circuit 124, such use can reduce the need for sophisticated, complex and costly anti-saturation loop circuits.

In prior power distribution networks, due to the ESR of a single Li-Ion battery power pack 120, the power amplifier circuit may be forced into saturation. Accordingly, there is a reduction in the RF power output from the power amplifier circuit when the charge on the battery is low.

For the alternative hybrid battery power pack 620, the step-down DC-to-DC converter 628 draws a consistently low current, with a maximum current change of about 300 mA. In contrast, for single the Li-Ion battery power pack 120, the maximum current draw may be in the order of 2.4 A. Conveniently, when using the circuit of FIG. 6, it is highly unlikely that the power amplifier circuit 124 will be forced into saturation because of the instant voltage drop due to the high pulsed current from the power amplifier circuit 124.

The power amplifier current loop has been defined hereinbefore. With a power amplifier current loop defined to have a significantly reduced area, as in the circuit of FIG. 6, it follows that the magnetic emission from the power amplifier current loop will have a significantly reduced magnitude, compared to the power amplifier current loop defined for the circuit of FIG. 1, thereby interfering to a lesser degree with magnetic-susceptible circuits, such as hearing aids, which utilize a T-coil to pick up an audio signal.

The single Li-Ion battery in power pack 120 may be considered to comprise a big coil (like a magnetic antenna). Despite designing a prior power distribution network to minimize the power amplifier current loop by moving the battery closer to the power amplifier, the current ripple through the battery may be shown to generate a strong magnetic field. The circuit of FIG. 6, by reducing the current ripple through the battery, may be shown to reduce magnetic emission from the battery.

In addition to propagation of the ripple generated at the power amplifier circuit 124 to other components relying on the power distribution network, radio frequency (RF) harmonics may also generated at the power amplifier circuit 124 during transmission. Such RF harmonics may be propagated to other components in the power distribution network and may cause undesirable effects. If the harmonics reach the battery, for example, the RF harmonics could be radiated, as an electric field, by the battery, due to the battery structure discussed hereinbefore.

Conveniently, propagation of RF harmonics from the power amplifier circuit 124 to other components in the power distribution network may be significantly reduced by the EMI filter 621 of FIG. 6. In the power distribution network design of FIG. 1, it is hard to insert a very aggressive EMI filter between the power amplifier circuit 124 supply line and the battery of the power pack 120 due to very high pulsed current, which will cause significant voltage drop and low efficiency due to high direct current resistance through the EMI filter. However, as illustrated in FIG. 6, the EMI filter 621 is out of the high pulsed current loop.

Where care has not been taken to locate battery terminals close to the power amplifier circuit 124, lengthy power supply traces on a printed circuit board (PCB) may be considered to use up valuable PCB real estate. Longer power supply traces may also be considered to cause increased ESR, with a corresponding reduction in perceived battery efficiency.

Lengthy power supply traces on a PCB may be avoided with the design illustrated in FIG. 6. By locating the supercapacitor 422, which carries high pulsed current, close to the power amplifier circuit 124, PCB real estate may be saved. Furthermore, the power supply trace between the battery 322A to the step-down DC-to-DC converter 628 will not be carrying a high current. Accordingly, minimizing the length, and the corresponding ESR, of the power supply trace between the battery 322A to the step-down DC-to-DC converter 628 is not as important as it is in situations where a higher current is carried.

Figure 7:
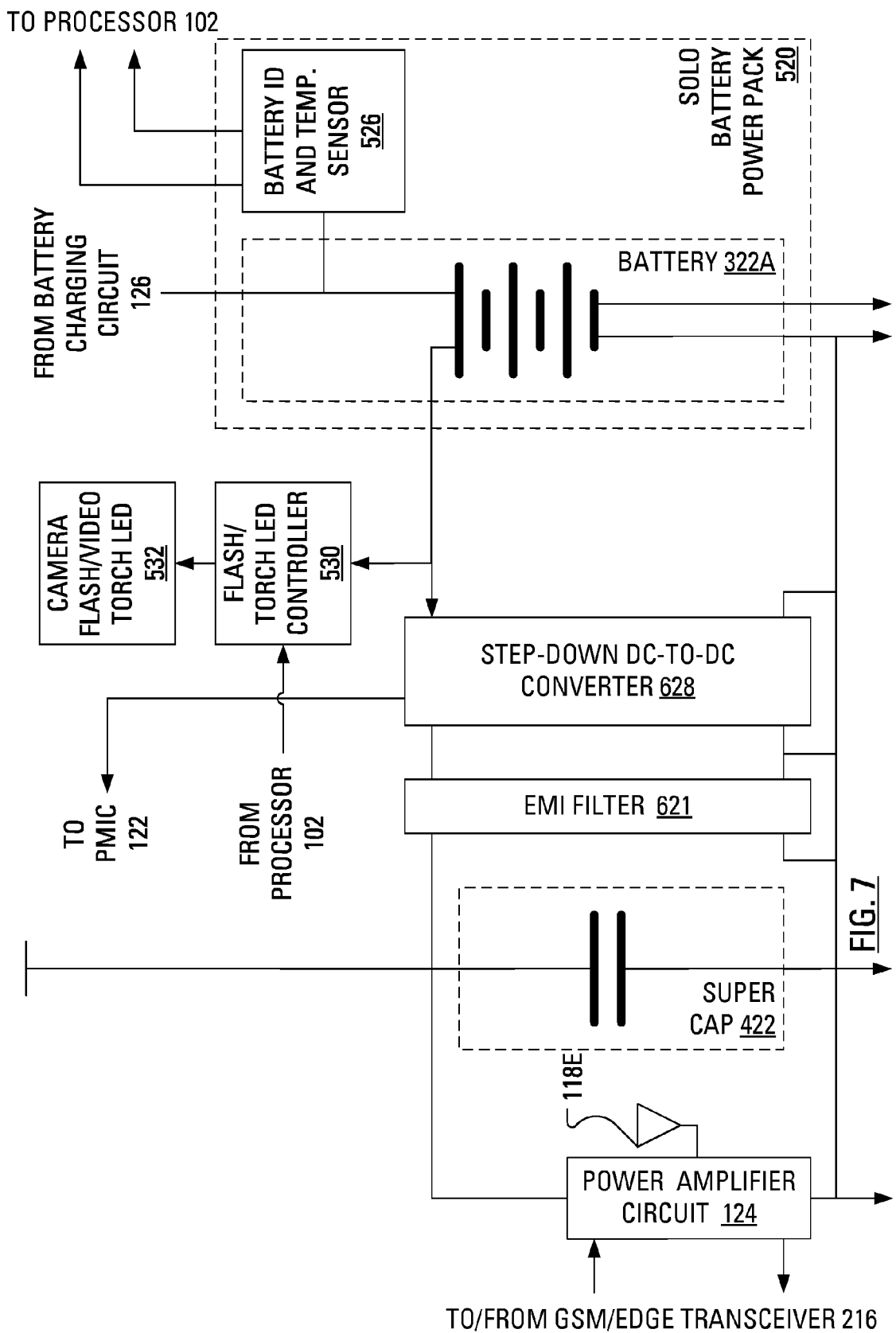
FIG. 7 illustrates a power amplifier circuit for use in a power distribution network having additional components, where the power amplifier circuit includes a battery, a supercapacitor, an EMI filter and a step-down DC-to-DC converter, where the battery is arranged to supply power to the additional components.

A further solution to the above set of problems involves rearrangement, illustrated in FIG. 7, of the components external to the solo battery power pack 520 of FIG. 5. As illustrated in FIG. 5 and FIG. 7, the first battery 322A of the solo battery power pack 520 has a first terminal connected to the battery charging circuit 126 and a second terminal connected to a common supply voltage for the power distribution network. A second terminal of the supercapacitor 422, which is external to the solo battery power pack 520, is also connected to the common supply voltage for the power distribution network. The first terminal of the first battery 322A is connected to the battery-side terminal of the step-down DC-to-DC converter 628.

The step-down DC-to-DC converter 628 converts the voltage available at the first terminal of the first battery 322A to a lower voltage and makes the lower voltage available, via the EMI filter 621, to the power amplifier circuit 124. The step-down DC-to-DC converter 628 also makes the lower voltage available to the PMIC 122 (FIG. 1).

The solo battery power pack 520 includes a battery identifier and temperature sensor 526. The battery identifier and temperature sensor 526 connects to the processor 102 (FIG. 1) to provide battery identity and information regarding the temperature of the solo battery power pack 520.

The circuit of FIG. 7 includes additional components that may be found in mobile communication devices, as illustrated in FIG. 5. The additional components include the LED 532 and the controller 530. The controller 530 receives power from the first terminal of the first battery 322A. Additionally, the controller 530 receives instructions from the processor 102 (FIG. 1).

It has been discussed hereinbefore that the pulse mode of power amplifier operation is known to cause a ripple in the power supply voltage provided at a battery and that the ripple may be shown to adversely affect operation of other circuits. It may also be shown that other circuits in a typical mobile communication device can cause a ripple in the power supply voltage. An example of such a ripple-causing circuit is the combination of the LED 532 and the controller 530 in FIG. 7.

In a typical mobile communication device, the power amplifier circuit 124 and the LED 532 may not be operated at the same time due to high pulsed power consumption and the resultant voltage ripples propagating to other circuits. It can be shown that use of the supercapacitor 422, with the step-down DC-to-DC converter 628 and the EMI filter 621, will allow simultaneous operation of the power amplifier circuit 124 and the LED 532, without causing significant power supply voltage ripples to propagate to other circuits.

In contrast to the power distribution networks represented by the circuits of FIGS. 1, 2, 3 and 4, the circuit of FIG. 5 and circuit of FIG. 7 make available continued operation of the mobile communication device even in the absence of the solo battery power pack 520. Accordingly, the mobile communication device may, for example, continue to participate in a cellular telephone call or continue to play a digital music file, even as a previously installed solo battery power pack is exchanged for a replacement solo battery power pack.

Although the device described may be a mobile communication device, the concepts are not necessarily limited to mobile communication devices, but may be applied or adapted to a variety of devices. The concepts may be realized with components of modest size or weight and considerations of size or weight may be important for mobile communication devices, especially those devices that are handheld (i.e., sized and shaped to be held or carried in a human hand). The concepts may be applied to devices that use communication formats other than those specifically mentioned, including some communication formats that have not yet been developed. Further, the concepts may be used in concert with one or more power supplies or energy storage devices, including power supplies and energy storage devices that have not yet been developed.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A power distribution network comprising:
a primary charging circuit;
a first charge storage component having a first terminal connected to said primary charging circuit and a second terminal connected to a power supply common voltage;
a second charge storage component having a first terminal, said second charge storage component having a second terminal connected to said power supply common voltage;
a converter having an input terminal and an output terminal, said input terminal receiving an input voltage from said first terminal of said first charge storage component, and said output terminal supplying an output voltage, wherein a magnitude of said output voltage is altered relative to a magnitude of said input voltage;
an electromagnetic interference filter having an input terminal and an output terminal, said input terminal of said electromagnetic interference filter receiving, from said output terminal of said converter, said output voltage and said output terminal of said electromagnetic interference filter supplying a filtered output voltage to said first terminal of said second charge storage component; and
a power amplifier circuit connected to said first terminal of said second charge storage component, said power amplifier circuit designed according to a range of variation of said filtered output voltage.

2. The power distribution network of claim 1 wherein said first charge storage component comprises a battery.

3. The power distribution network of claim 1 wherein said second charge storage component comprises a supercapacitor.

4. The power distribution network of claim 1 further comprising a power pack enclosing said first charge storage component, said converter and said second charge storage component.

5. The power distribution network of claim 4 further comprising a battery identifier enclosed by said power pack and connected to said first terminal of said first storage component.

6. The power distribution network of claim 5 wherein said battery identifier is adapted to output an identification of said power pack.

7. The power distribution network of claim 4 further comprising a temperature sensor enclosed by said power pack and adapted to sense a temperature within said power pack and provide an output signal indicative of said temperature.

8. The power distribution network of claim 1 further comprising a power pack enclosing said first charge storage component.

9. The power distribution network of claim 8 further comprising a battery identifier enclosed by said power pack and connected to said first terminal of said first storage component.

10. The power distribution network of claim 9 wherein said battery identifier is adapted to output an identification of said power pack.

11. The power distribution network of claim 8 further comprising a temperature sensor enclosed by said power pack and adapted to sense a temperature within said power pack and provide an output signal indicative of said temperature.

12. The power distribution network of claim 1 wherein said electromagnetic interference filter comprises a low pass filter.

13. The power distribution network of claim 12 wherein said electromagnetic interference filter comprises a series inductance and a shunt capacitance.

14. The power distribution network of claim 13 wherein said inductance comprises a ferrite bead.

* * * * *